Patented Feb. 23, 1937

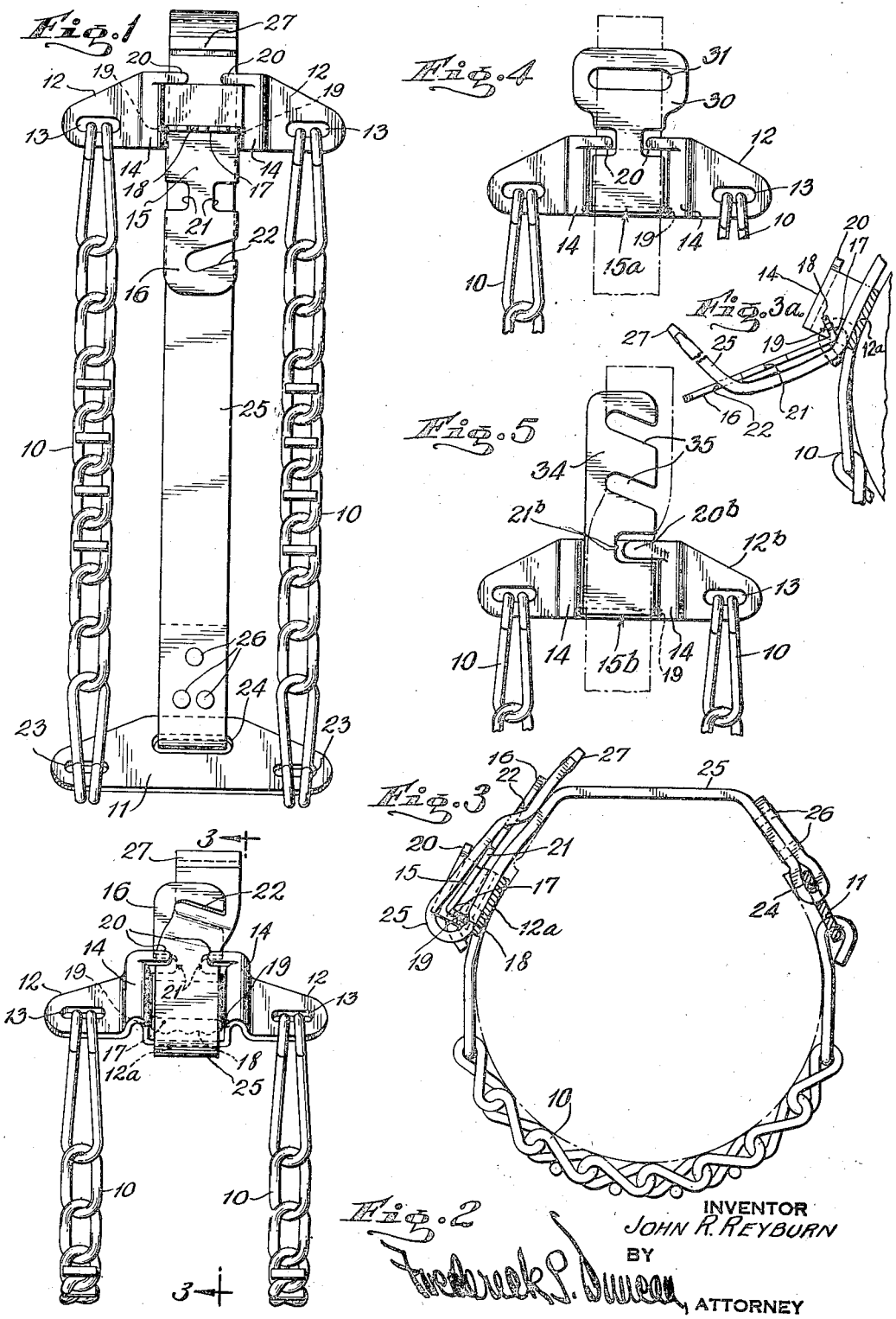

2,071,940

UNITED STATES PATENT OFFICE 2,071,940

BUCKLE

John R. Reyburn, Fairfield, Conn., assignor to American Chain Company, Inc., a corporation of New York Application January 28, 1935, Serial No. 3,707

6 Claims. (Cl. 24—193)

The present invention relates to improvements in buckles of the type in which, during the buckling operation, there is an automatic take-up of the strap or other tension member to which the buckle is applied.

My improved buckle is particularly adapted for use in strapping anti-skid devices about an automobile tire and has for an object to provide an increased take-up so that the device may be very tightly applied to the tire.

Another object of the invention is to provide improved means for securing the parts against accidental release or loosening.

A further object of the invention is to provide means for securing the free end of the strap or other tension member so that it will not fly out under centrifugal force and slap against the fender of the car. It will be understood that anti-skid devices are usually employed only for emergency purposes being removed after the emergency is over and then reapplied when needed. By securing the free end of the strap the latter is protected from fraying or such wear as might interfere with subsequent operation of the buckle.

Other objects and advantages of my invention will appear in the following description of a preferred embodiment and certain modifications thereof and thereafter the novelty and scope of the invention will be pointed out in the claims.

In the accompanying drawing;

Figure 1 is a plan view of an anti-skid device provided with my improved buckle, the device being shown in unbuckled condition and laid out flat;

Fig. 2 is a view in side elevation of the anti-skid device in buckled condition in the position it would occupy when applied to an automobile tire;

Fig. 3 is a view in section taken substantially on the line 3—3 of Fig. 2;

Fig. 3a is a fragmental sectional view also taken on line 3—3 of Fig. 2 but showing the buckle in open or unclamped position;

Fig. 4 is a plan view of a modified form of buckle; and,

Fig. 5 is a plan view of still another form of buckle.

The anti-skid device shown in the drawing comprises a pair of chains 10 linked at one end to a yoke 11 and at the opposite end to a yoke 12 which constitutes the frame member of my improved buckle. This frame member preferably consists of a plate of sheet metal having slots 13 at opposite ends thereof to which the chains 10 are linked. The metal plate is bent to form a pair of parallel ribs 14 running in the general direction of the chains 10. The ribs are spaced apart sufficiently to provide a seat 12a therebetween for a strap 25, as will be explained hereinafter.

Mounted between the ribs 14 is a cam lever 15 which is also formed of sheet metal bent to provide a long arm 16 and a cam portion or much shorter arm 17 disposed substantially at right angles to the long arm. The cam portion terminates in a serrated edge 18. Projecting laterally from the shorter arm 17 are trunnions 19 which are journaled in suitable openings formed in the ribs 14. The length of arm 17 beyond the axis of the trunnions is sufficient to compress and tightly clamp the strap against the seat 12a when the cam lever is swung into clamping position, as shown in Fig. 3.

The trunnion journals are located adjacent the inner end of the seat 12a, and at the opposite or entrant end the ribs 14 are formed with opposed lugs or tongues 20 which project over said seat. The arm 16 of the cam lever is provided with notches 21 to clear the tongues 20 when the lever is swung to the clamping position. The arm 16 is also provided with an open slot or notch 22 extending transversely from one lateral edge of the arm and preferably outwardly inclined from normal to said edge.

The yoke 11, aside from having slots 23 near opposite ends thereof to which the chains 10 are linked, is provided with a central slot 24. The strap 25 is secured to the yoke by looping an end of the strap through the slot 24, then riveting it fast to the body of the strap as shown at 26. The strap is preferably made of heavy canvas and the opposite or free end thereof may be suitably reinforced to prevent raveling or wear, as indicated at 27. Obviously, this strap can be made of leather or other flexible material if desired.

In operation, the anti-skid device is passed about an automobile tire with the chains 10 on the tread portion of the tire and the strap portion 25 passing around the felly of the automobile wheel. The cam lever is swung to the position shown in Fig. 3a and the strap 25 is threaded first under the tongues 20 and then between the seat 12a and the cam lever. After being drawn taut the strap end is inserted in the notch 22. Then, gripping the strap and the arm 16, the cam lever is swung on its trunnions to the position shown in Fig. 3. Because the trunnions are not located at the apex of the angle between arms 16 and 17 but at a point removed therefrom, there must be considerable takeup of the strap as the lever is being swung to clamping position unless the strap slips on the lever. By inserting and cramping the strap end in notch 22 such slipping is easily prevented. After the hand lever has been swung through an angle of substantially 45 degrees from the position shown in Fig. 3a, the serrated edge 18 of the cam arm 17 will begin to bite into the strap and will increase the take-up until the strap is firmly clamped between the edge 18 and the seat 12a. The cam lever is swung to a position in which the arm 17 moves past normal to the seat 12a, so that tension on the strap causes the serrations 18 to pinch the strap more tightly. The strap end now overlies the tongues 20 but it is unhooked from the notch 22 and is threaded under the tongues 20, bridging over the notches 21 so that the arm 16 cannot then be swung back to unclamp the buckle. Thereafter, the free end of the strap is hooked into the notch 22. In this position it is firmly clamped so that it cannot be slung out by centrifugal force and consequently will maintain its position under the tongues 20, locking the buckle against accidental release.

When it is desired to unclamp the buckle the strap is unhooked from the notch 22 and drawn out from under the tongues 20. Thereafter, the arm 16 may readily be raised to release its grip on the strap. The reason for the inclination of the notch 22 will be evident upon inspection of Fig. 2. It will be noted that the strap end must be distorted in order to introduce it into the notch 22. Such distortion tends additionally to lock the strap end in the slot 22 and also tends to hold the strap against slipping accidentally out of the slot.

The construction shown in Fig. 4 is very similar to that described above, the only difference being in the form of the cam lever. Substantially identical parts in Fig. 4 and Figs. 1 to 3a are therefore given the same reference numerals. The cam lever shown in Fig. 4 is indicated generally by the reference numeral 15a. This lever differs from the cam lever 15 in the fact that its longer arm 30 is somewhat widened at its outer end to accommodate a closed transverse slot 31. This buckle is applied just as is the one shown in Fig. 1 except that the free end of the strap must be threaded through the closed slot 31 when moving the cam lever to clamping position and thereafter it must be withdrawn from the slot, passed under the tongues 20, and again threaded through the slot. An advantage of this arrangement is that the strap end is not distorted as in Fig. 2, thus improving the appearance of the device.

The construction shown in Fig. 5 differs from that shown in Fig. 1 in having a frame 12b with a single tongue 20b extending substantially to the middle of the cam lever 15b. The latter differs from cam 15 in having a single deep notch 21b to clear the tongue 20b. The lever 15b also has an arm 34 which is longer than the arm 16, and extending inwardly from one side edge of the arm 34 are two notches 35 which like the notch 22 are inclined from normal to said edge. The two notches 35 will take care of an extra length of strap. In other words, if the anti-skid device is applied to a tire of comparatively small diameter there will be a surplus length of the strap 25 which may be accommodated by passing it downwardly through one notch 35 and upwardly through the other notch 35. This also provides an increased grip of the arm 34 on the strap so that when the lever 15b is being swung into clamping position there will be no danger of slippage of the strap with respect to arm 34 and a maximum take-up will be assured. An advantage of having a single tongue 20b is that the strap does not have to be threaded lengthwise thereunder but may be slipped laterally under the tongue and then into one or both of the notches 35. The tongue 20b extends so far across the strap that said strap cannot slip out accidentally, particularly since its opposite edge is held down by engagement with a notch 35. Thus, the arm 34 is maintained in clamping position.

Obviously my buckle is not limited to use with an anti-skid device but may be employed for other purposes as well. While I have described a preferred embodiment of my invention and certain modifications or variations thereof I wish it to be understood that these are to be taken as illustrative and not limitative and that I reserve the right to make various changes in form, construction and arrangement of parts without departing from the spirit and scope of my invention as pointed out in the following claims.

I claim:

1. A buckle of the character described comprising a frame having a seat for the adjacent portion of a strap, a cam lever pivoted to the frame for movement to and from a position to clamp such strap portion upon said seat, said lever having an operating arm extending toward and projecting beyond the entrant end of the buckle when the lever is in clamping position and being formed in said projecting part with an open slot extending from a lateral edge thereof to receive the free end of the strap therein whereby the strap may be bent back with said arm over the entrant end of the buckle as the lever is moved to clamping position, and a tongue formed on the frame and projecting over said seat at the entrant end of the buckle, said arm being notched to clear the tongue, the tongue being spaced above the seat sufficiently to permit of inserting the free end of the strap between the tongue and the arm so as to hold the lever in clamping position.

2. A buckle of the character described comprising a frame having a seat for the adjacent portion of a strap, a cam lever pivoted to the frame for movement to and from a position to clamp such strap upon said seat, said lever having an operating arm extending toward and beyond the entrant end of said buckle when the lever is in clamping position, the arm being formed with a slot opening from a lateral edge of the arm and inclined from normal to said edge whereby the free end of the strap may be received in said slot and be bent back with said arm over the entrant end of the buckle as the lever is moved to clamping position, and means rigid on the frame for engaging and holding said strap end in its returned position and thereby holding the lever in its clamping position.

3. A buckle of the character described comprising a frame having a seat for the adjacent portion of the strap, a cam lever pivoted to the frame for movement to and from a position to clamp such strap upon said seat, said lever having an operating arm extending toward and beyond the entrant end of said buckle when the lever is in clamping position, the arm being formed with a pair of open slots extending from a lateral edge of the arm and inclined from normal to said edge whereby the free end of the strap may be received in said slots and be bent back with said arm over the entrant end of the buckle as the lever is moved to clamping position, and means rigid on the frame for engaging and holding said strap end in its returned position and thereby holding the lever in its clamping position.

4. A buckle of the character described comprising a frame having a seat for the adjacent portion of a strap, and a cam lever pivoted to the frame for movement to and from a position to clamp such strap portion upon said seat, said lever having an operating arm extending toward the entrant end of the buckle when the lever is in clamping position, the frame being formed with an abutment at one side of the seat and said arm being formed with a notch near its outer end and on the same side as the abutment, said notch serving to receive the free end of the strap when the lever is in clamping position but being of such depth and location as to distort the strap end laterally and clamp said strap end against said abutment.

5. A buckle of the character described comprising a frame having a seat for the adjacent portion of a strap, a cam lever pivoted to the frame for movement to and from a position to clamp such strap portion upon such seat, the free end of said lever being formed with a bearing surface upon which pressure may be exerted to move the lever to clamping position, said bearing portion of the lever projecting beyond the entrant end of the buckle when the lever is in clamping position and being formed with an open slot extending from a lateral edge of said projecting bearing portion for attaching the free end of the strap thereto whereby the strap may be bent back with said arm over the entrant end of said buckle as the lever is moved to clamping position, and means rigid on the frame intermediate between the slot and the pivotal point of said lever for engaging and holding said strap end in its returned position and thereby holding the lever in its clamping position.

6. A buckle of the character described comprising a frame having a seat for the adjacent portion of a strap, a cam lever pivoted to the frame for movement to and from a position to clamp said strap upon said seat, said lever having an operating arm extending toward and projecting beyond the entrant end of said buckle when the lever is in clamping position and formed in such projecting portion with a slot opening from a lateral edge thereof and inclined from normal to said edge in a direction veering from said edge toward the outer end of the arm, whereby the free end of the strap may be received in said slot and be bent back with said arm over the entrant end of the buckle as the lever is moved to clamping position, and a tongue formed on the frame at the side of the arm in which said slot is formed and projecting over said seat at the entrant end of the buckle, said arm being formed with a notch to clear the tongue, the tongue being spaced above the seat sufficiently to permit of inserting the free end of the strap between the tongue and the arm so as to hold the lever in clamping position.

JOHN R. REYBURN.